United States Patent
Kobata et al.

(10) Patent No.: US 11,865,917 B2
(45) Date of Patent: Jan. 9, 2024

(54) HEAD-UP DISPLAY CONTROL SYSTEM AND HEAD-UP DISPLAY DISPLAY METHOD

(71) Applicant: HONDA MOTOR CO., LTD., Tokyo (JP)

(72) Inventors: Seiji Kobata, Wako (JP); Yuya Obayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 17/580,096

(22) Filed: Jan. 20, 2022

(65) Prior Publication Data

US 2022/0234445 A1 Jul. 28, 2022

(30) Foreign Application Priority Data

Jan. 27, 2021 (JP) ................. 2021-010800

(51) Int. Cl.
*B60K 35/00* (2006.01)
*B60R 11/02* (2006.01)
*B60R 11/00* (2006.01)

(52) U.S. Cl.
CPC .......... *B60K 35/00* (2013.01); *B60R 11/0241* (2013.01); *B60K 2370/1529* (2019.05);
(Continued)

(58) Field of Classification Search
CPC ............ B60K 35/00; B60K 2370/1529; B60K 2370/31; B60K 2370/573;
(Continued)

(56) References Cited

U.S. PATENT DOCUMENTS

| 2014/0125583 A1* | 5/2014 | Aoki | B60K 37/02 |
| | | | 345/156 |
| 2015/0352953 A1* | 12/2015 | Koravadi | B60K 37/06 |
| | | | 701/36 |

(Continued)

FOREIGN PATENT DOCUMENTS

| CN | 106462909 A | * | 2/2017 | ............ B60K 35/00 |
| CN | 106605165 A | * | 4/2017 | ............ B60K 35/00 |

(Continued)

OTHER PUBLICATIONS

Japanese Office Action received in corresponding Japanese application No. 2021-010800 dated Nov. 15, 2022 with English translation (8 pages).

*Primary Examiner* — Hung Q Nguyen
(74) *Attorney, Agent, or Firm* — Rankin, Hill & Clark LLP

(57) ABSTRACT

A normal information display quantity of a head-up display device is set as a first information display quantity, an information display quantity of the head-up display device after a control unit receives a detection signal of detection of installation of a mobile terminal on a terminal holder from a mobile terminal installation detection unit is set as a second information display quantity, in which the second information display quantity is set to be smaller than the first information display quantity, and at least a part of display information that is displayed in the first information display quantity but is not displayed in the second information display quantity is displayed on the mobile terminal.

4 Claims, 7 Drawing Sheets

(52) U.S. Cl.
CPC .... *B60K 2370/31* (2019.05); *B60K 2370/566* (2019.05); *B60K 2370/573* (2019.05); *B60K 2370/782* (2019.05); *B60R 2011/001* (2013.01)

(58) Field of Classification Search
CPC ........ B60K 2370/152; B60K 2370/834; B60K 2370/182; B60R 11/0241
See application file for complete search history.

(56) References Cited

U.S. PATENT DOCUMENTS

2019/0149607 A1* 5/2019 Shim .................... B60K 35/00
 307/10.1
2020/0339147 A1 10/2020 Hayakawa et al.

FOREIGN PATENT DOCUMENTS

| | | | | |
|---|---|---|---|---|
| FR | 3052887 A1 | * | 12/2017 | ............ B60K 35/00 |
| JP | 2005-284886 A | | 10/2005 | |
| JP | 2013-100032 A | | 5/2013 | |
| JP | 2014-216714 A | | 11/2014 | |
| JP | 2019-119248 A | | 7/2019 | |
| JP | 2020-138609 A | | 9/2020 | |
| WO | WO-2013061447 A1 | * | 5/2013 | ............ B60K 35/00 |
| WO | WO-2019208365 A1 | * | 10/2019 | |

\* cited by examiner

HEAD-UP DISPLAY CONTROL SYSTEM AND HEAD-UP DISPLAY DISPLAY METHOD

CROSS-REFERENCE TO RELATED APPLICATION

This application is based upon and claims priority from the Japanese Patent Application No. 2021-010800, filed on Jan. 27, 2021, the entire contents of which are incorporated herein by reference.

BACKGROUND

Technical Field

The present invention relates to a head-up display control system and a head-up display display method.

Related Art

Conventionally, there is known a vehicle provided with a head-up display (hereinafter, referred to as a head-up display (HUD) device) that displays an image regarding basic information for a driver on a front windshield.

For example, JP 2014-216714 A discloses that a part of information displayed on a mobile terminal operated by a passenger is displayed on a HUD device, or conversely, a part of information displayed on the HUD device is displayed on the mobile terminal operated by the passenger.

SUMMARY

There is a case where a user of a vehicle prefers displaying information on another mobile terminal installed in the vehicle rather than displaying information on a front windshield. In the HUD device disclosed in JP 2014-216714 A, the passenger needs to operate the mobile terminal, which is complicated, and it is difficult for the driver to easily visually recognize the mobile terminal operated by the passenger.

The present invention is achieved in view of the above-described points, and an object thereof is to provide a head-up display control system and a head-up display display method capable of changing an information display quantity of a head-up display device corresponding to an installation status of a mobile terminal.

In order to achieve the above-described object, the present invention

The present invention may realize a head-up display control system and a head-up display display method capable of changing an information display quantity of a head-up display device corresponding to an installation status of a mobile terminal.

DETAILED DESCRIPTION

Figure 3:
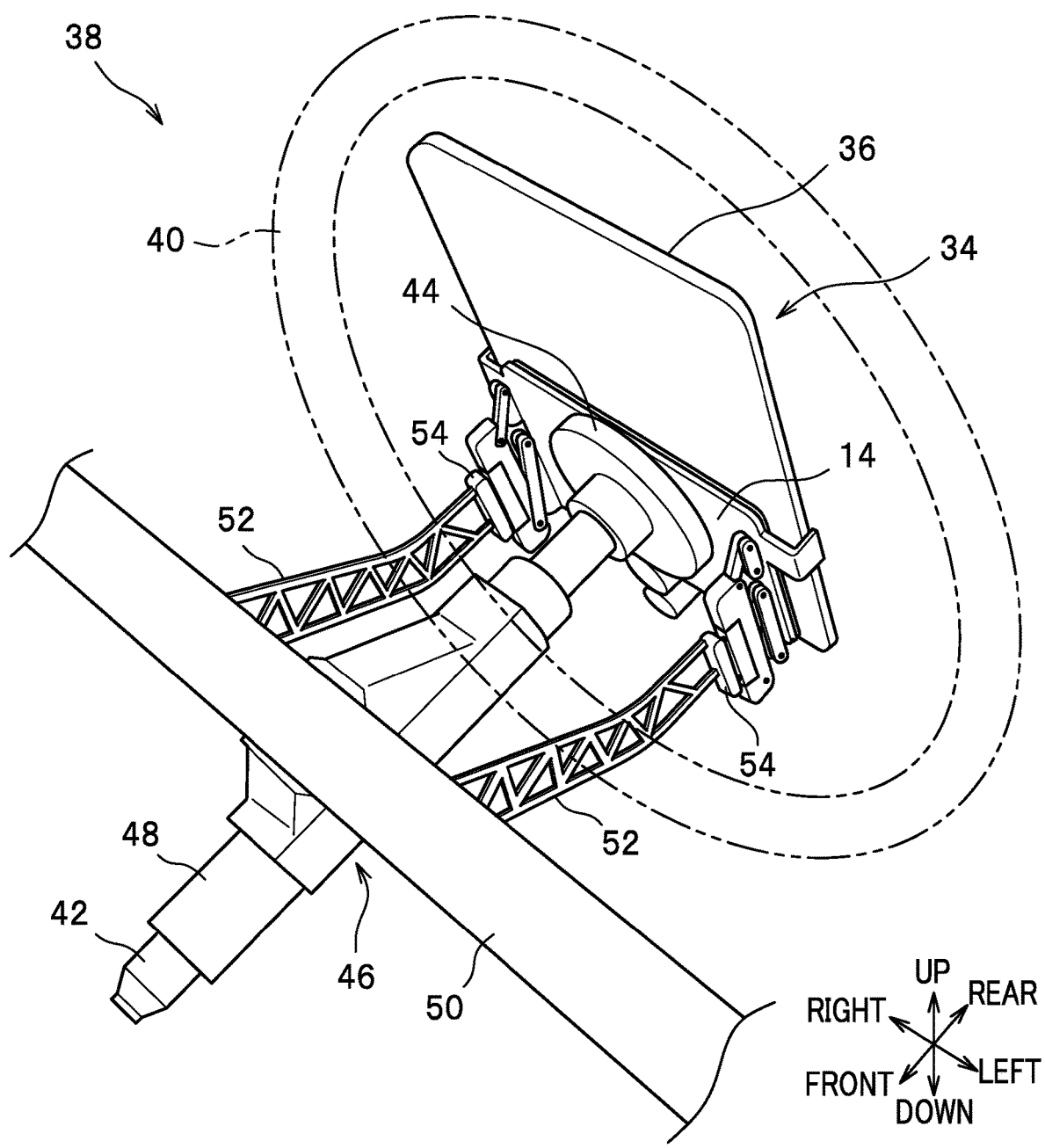
FIG. 3 is a partial virtual perspective view illustrating a state in which a mobile terminal is installed on a terminal holder illustrated in FIG. 1.
Figure 6:
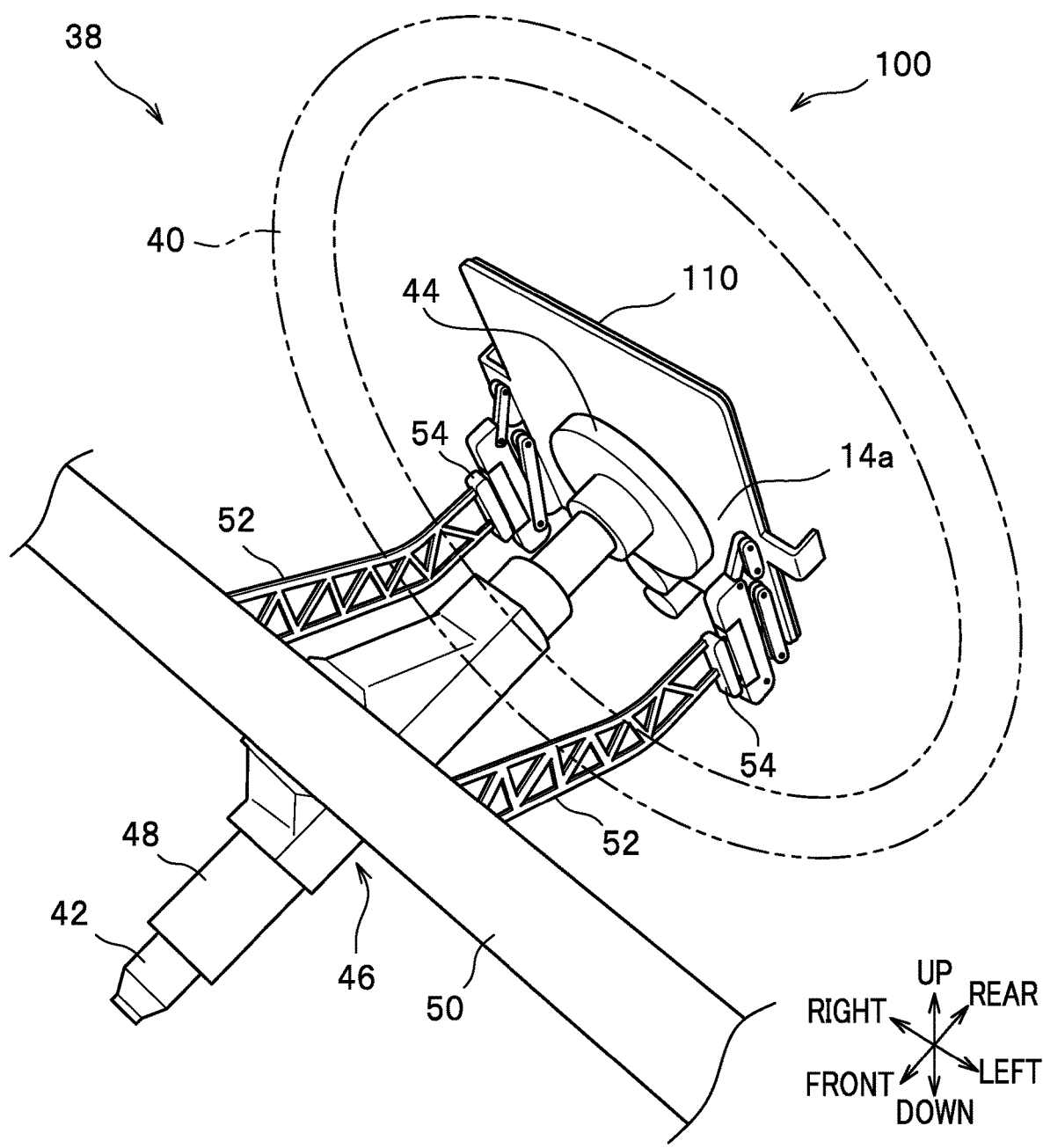
FIG. 6 is a partial virtual perspective view illustrating a state in which a mobile terminal is not installed yet on a terminal holder in a head-up display control system according to another embodiment of the present invention.
Figure 7:
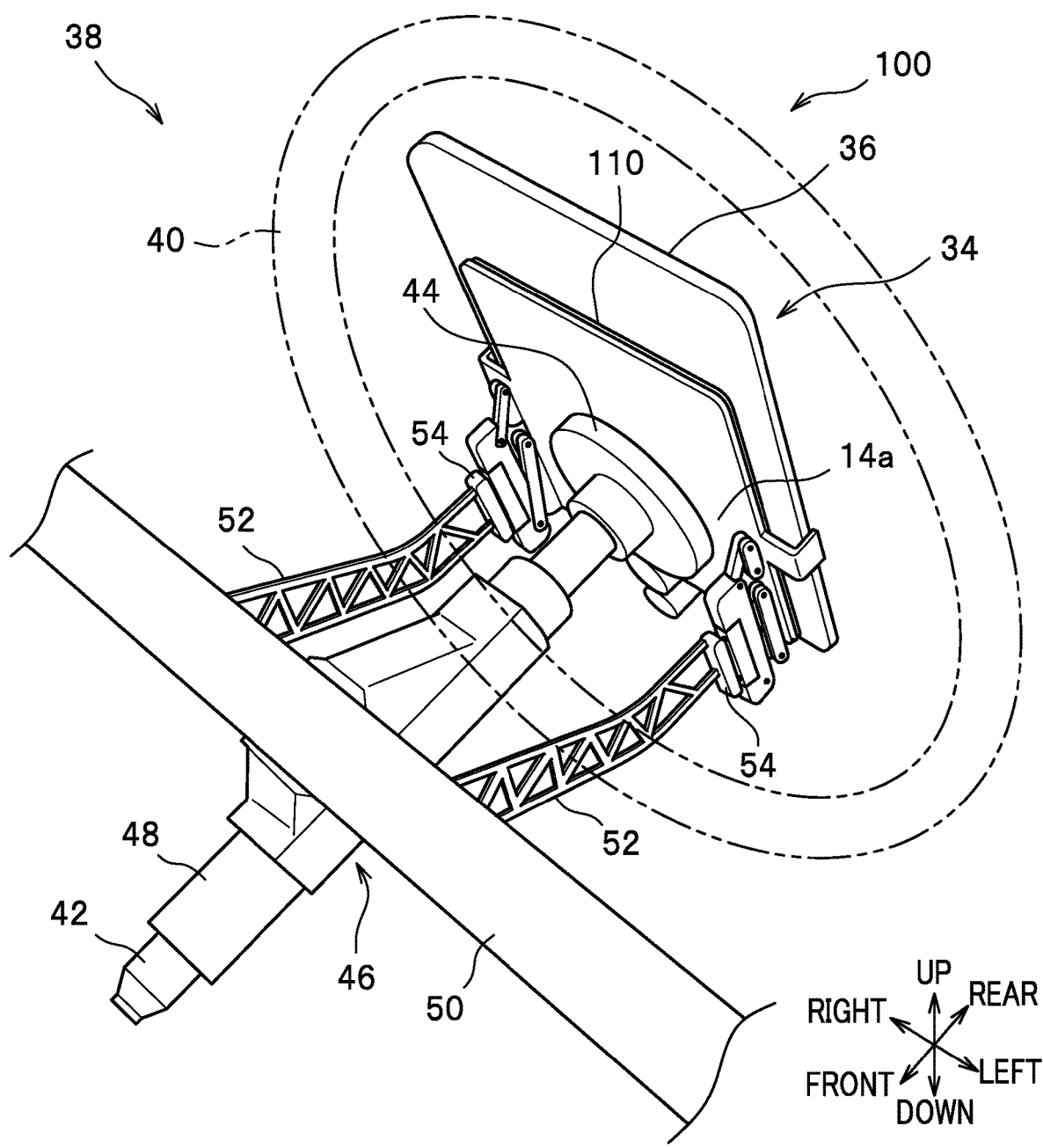
FIG. 7 is a partial virtual perspective view illustrating a state in which the mobile terminal is installed on the terminal holder in the state illustrated in FIG. 6.

Next, an embodiment of the present invention is described in detail with reference to the drawings as appropriate. In FIGS. 3, 6, and 7, "front/rear" indicates a vehicle front-and-rear direction, "right/left" indicates a vehicle width direction (right-and-left direction), and "up/down" indicates a vehicle up-and-down direction (vertical up-and-down direction).

Figure 1:
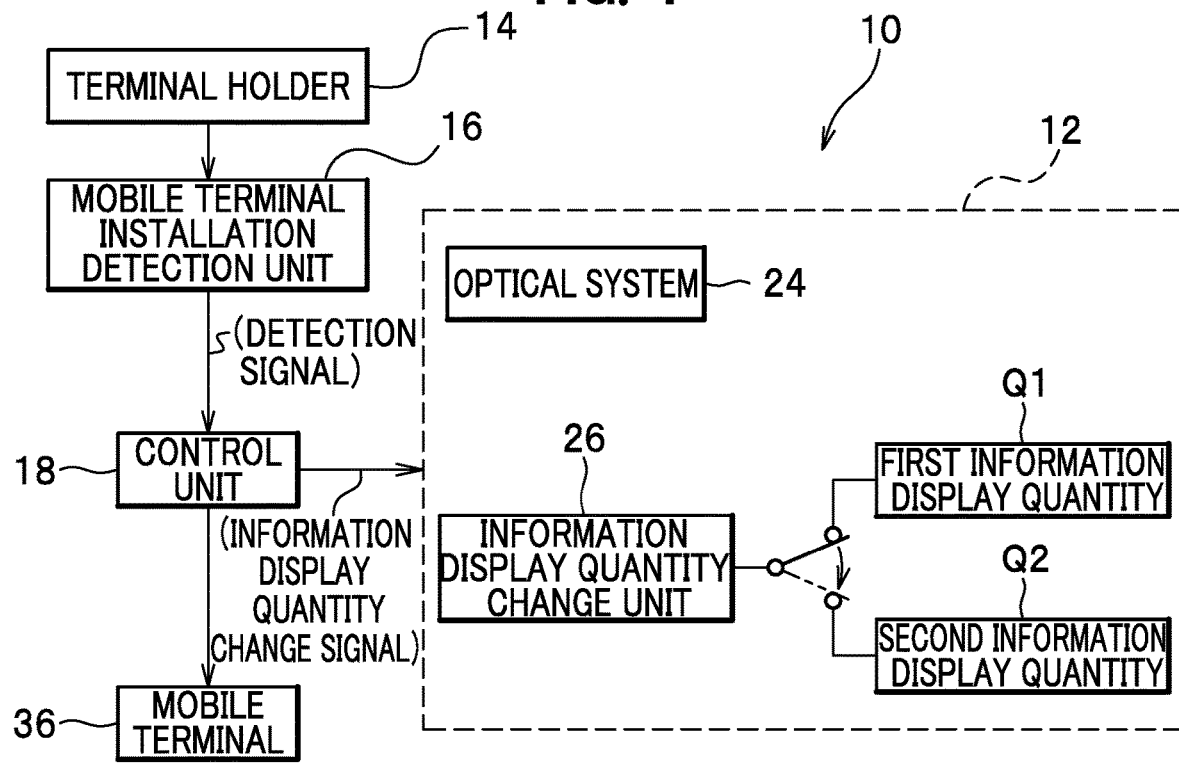
FIG. 1 is a block configuration diagram of a head-up display control system according to an embodiment of the present invention.

As illustrated in FIG. 1, a head-up display control system 10 according to an embodiment of the present invention is provided with a head-up display device 12 (hereinafter, referred to as a HUD device 12), a terminal holder 14, a mobile terminal installation detection unit 16, and a control unit 18.

The HUD device 12 displays display information such as, for example, a vehicle speed, a shift position, travel guidance, warning display, and an operation status of a drive support function in a position overlapping with a window. Specifically, for example, this is displayed on a lower side of a front window (window) 22 as a virtual image 20 so as to float in a vehicle front position with respect to a driver (refer to FIG. 2). The HUD device 12 includes an optical system 24 and an information display quantity change unit 26 (refer to FIG. 1).

Figure 2:
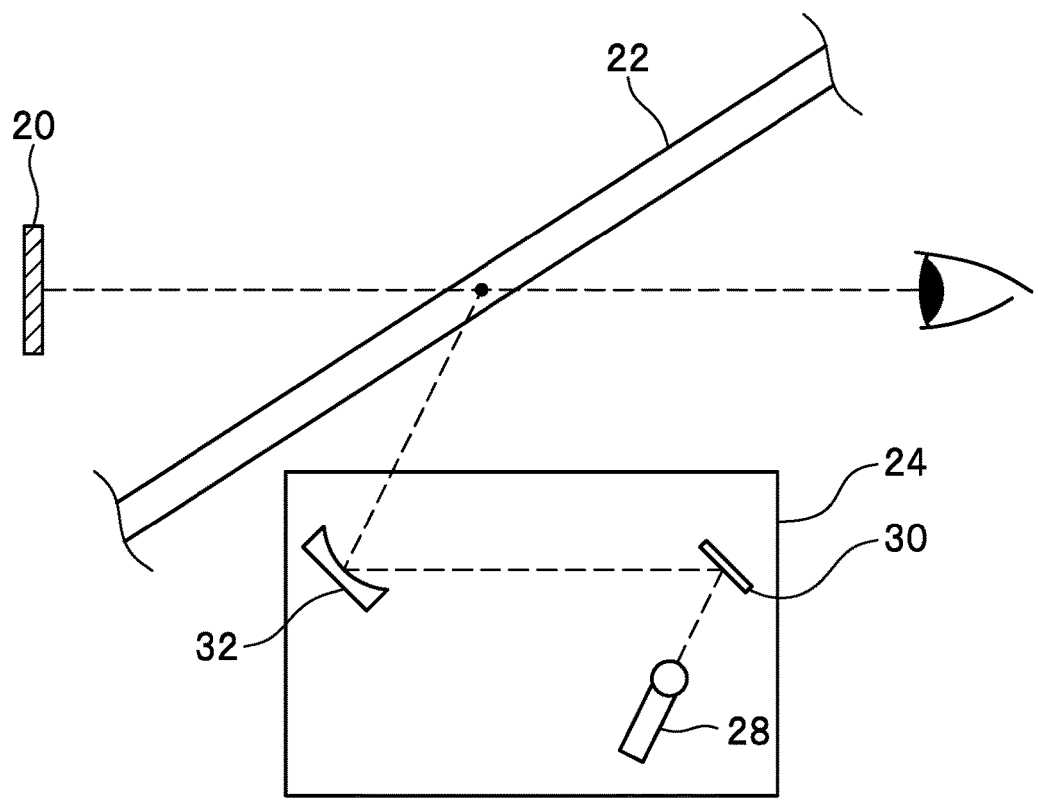
FIG. 2 is a schematic diagram illustrating a display principle of an optical system forming a head-up display device illustrated in FIG. 1.

As illustrated in FIG. 2, the optical system 24 is provided with a light source 28, a reflection mirror (plane mirror) 30, and concave mirror (magnifier) 32. The optical system 24 is mounted, for example, in a space on a back side of an instrument panel located on a vehicle front side with respect to the driver. The light source 28 is formed of, for example, a cold cathode tube or a light emitting diode, and outputs visible light corresponding to the virtual image 20 visually recognized by the driver. The visible light (information) emitted from the light source 28 is returned back by the reflection mirror 30 to be enlarged by the concave mirror 32. The display enlarged by the concave mirror 32 is reflected by the front window 22, and the driver may visually recognize the same as the virtual image 20.

The HUD device 12 includes the information display quantity change unit 26 that changes an information display quantity (type of display information) displayed as the virtual image 20 on the front window 22. The information display quantity change unit 26 switches the information display quantity of the virtual image 20 from a first information display quantity Q1, which is a normal information display quantity of the virtual image 20 of the HUD device 12 set in advance, to a second information display quantity Q2 with fewer types of display information as compared with the first information display quantity Q1 when the mobile terminal installation detection unit 16 detects that the mobile terminal 36 is installed on the terminal holder 14 (Q1→Q2).

The first information display quantity Q1 and the second information display quantity Q2 may be manually set in advance by an operator, for example, or it is possible to detect an area (refer to FIG. 4B) of a superimposed portion S between the virtual image 20 and the mobile terminal 36 by an imaging sensor not illustrated installed in the vehicle, and the control unit 18 automatically determines the second information display quantity Q2 using detection information thereof.

The terminal holder 14 is arranged in the vicinity of the front window 22 in a vehicle interior, on a rear side of the instrument panel, and on a back side (front side) of a steering wheel 40. As illustrated in FIG. 3, the terminal holder 14 supports a rear surface of a mobile terminal 36 including a display screen 34 on a front surface visible to the driver, so that the mobile terminal 36 is installed thereon.

The terminal holder 14 has a horizontally long rectangular shape in a horizontal direction as seen from a vehicle rear side, and is arranged behind the steering wheel 40 in an annular shape that forms a steering mechanism 38 of a vehicle (vehicle front side). The installed mobile terminal 36 is in a state in which the display screen 34 is exposed from the inside of the steering wheel 40 toward the vehicle rear side. That is, the mobile terminal 36 is installed on the terminal holder 14 in a state in which the driver may look straight at the display screen 34 inside the steering wheel 40. Both ends in the vehicle width direction of the terminal holder 14 are supported by a pair of arms 52 and 52 to be described later (refer to FIG. 3).

A shaft 42 is inserted into a cylindrical portion 48 extending in the vehicle front-and-rear direction of a steering hanger 46. A steering hanger pipe 50 of the steering hanger 46 is fixed above the cylindrical portion 48 so as to be orthogonal to the cylindrical portion 48. The steering hanger pipe 50 extends in the vehicle width direction, and the pair of arms 52 and 52 is fixed to positions equidistant from a position orthogonal to the cylindrical portion 48 to both right and left sides.

Each arm 52 protrudes to extend to the vehicle front side. The terminal holder 14 is supported by support units 54 and 54 at distal ends of the pair of extending arms 52 and 52. A disk 44 is fixed to a distal end of the shaft 42 on a side opposite to the cylindrical portion 48. The disk 44 is arranged so as to be spaced apart from the terminal holder 14 with a clearance therebetween.

The mobile terminal installation detection unit 16 detects whether the mobile terminal 36 is installed on the terminal holder 14. The mobile terminal installation detection unit 16 includes, for example, one that detects installation by a mechanical means and one that detects installation by an electric means or a magnetic means such as a sensor. As the mechanical means, for example, a switch mechanism may be provided in which a plate spring not illustrated having conductivity is mounted on a front surface of the terminal holder 14 in contact with the rear surface of the mobile terminal 36 or a lower surface of the terminal holder 14 in contact with a lower surface of the mobile terminal 36, and the plate spring is elastically deformed by being pressed by the mobile terminal 36 installed on the terminal holder 14 to be brought into contact with a conductive metal plate arranged in the vicinity of the plate spring, so that a switch is switched from an off state to an on state.

As the electric means, for example, a proximity switch (proximity sensor) and the like not illustrated may be mounted on the terminal holder 14, and the installation of the mobile terminal 36 on the terminal holder 14 may be detected by a detection signal output from the proximity switch.

The control unit 18 controls the HUD device 12. The control unit 18 changes the information display quantity of the virtual image 20 of the HUD device 12 from the first information display quantity Q1 to the second information display quantity Q2 when the installation of the mobile terminal 36 is detected by the mobile terminal installation detection unit 16.

The head-up display control system 10 according to this embodiment is basically configured as described above, and functions and effects thereof are next described.

Figure 4A:
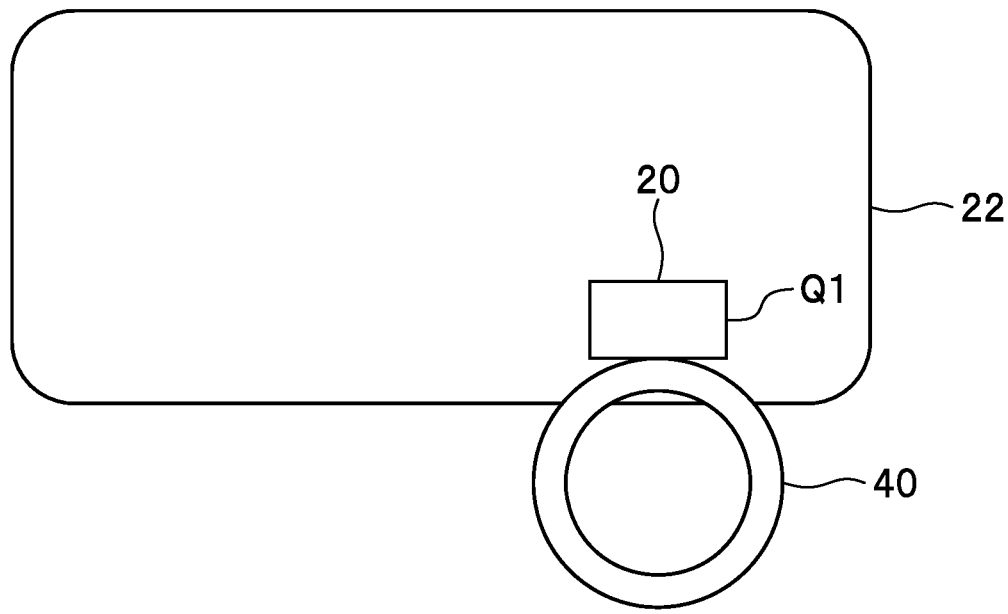
FIG. 4A is a schematic diagram illustrating a first information display quantity of a virtual image of the head-up display device in a state in which the mobile terminal is not installed on the terminal holder.
Figure 5A:
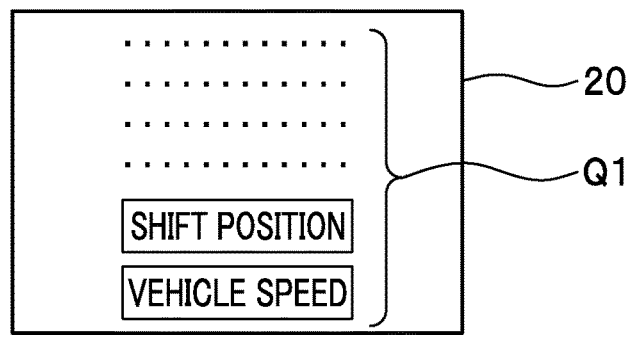
FIG. 5A is a schematic diagram illustrating a specific example of the first information display quantity displayed on the virtual image.

First, in this embodiment, the mobile terminal installation detection unit 16 detects whether the mobile terminal 36 is installed on the terminal holder 14. In a state in which the mobile terminal 36 is not installed on the terminal holder 14, the information display quantity of the virtual image 20 of the HUD device 12 is kept at the normal first information display quantity Q1 set in advance (refer to FIGS. 4A and 5A).

Figure 4B:
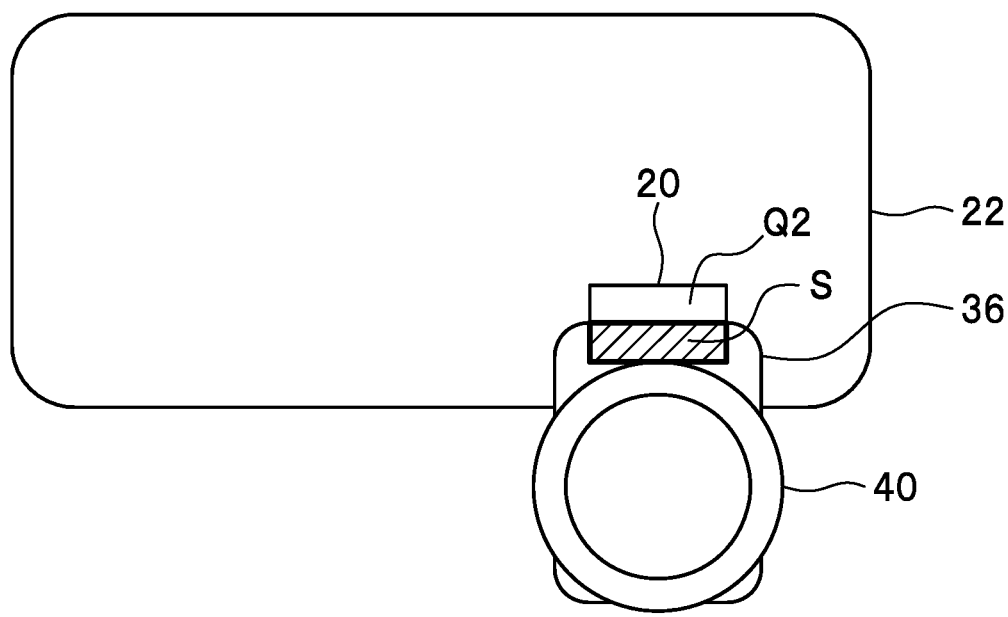
FIG. 4B is a schematic diagram illustrating a second information display quantity of the virtual image of the head-up display device in a state in which the mobile terminal is installed on the terminal holder.
Figure 5B:
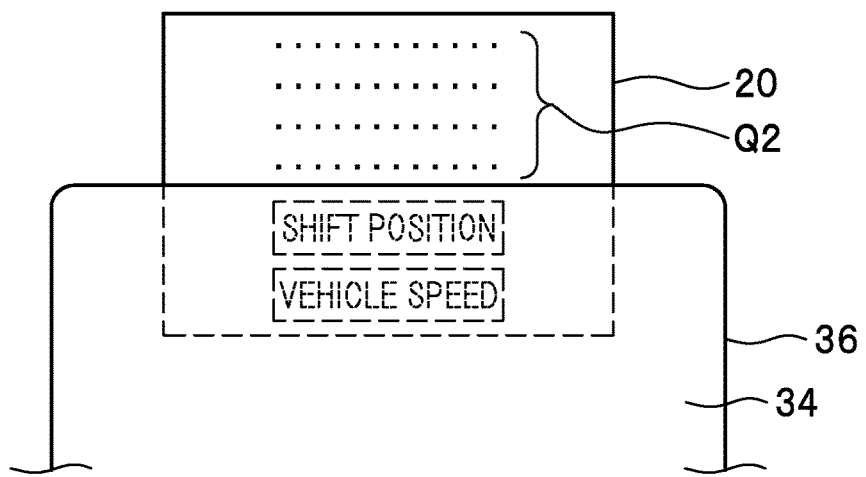
FIG. 5B is a schematic diagram illustrating a specific example of the second information display quantity after the mobile terminal is installed on the terminal holder.

For example, when the mobile terminal 36 such as a tablet is installed on the terminal holder 14 arranged on the back side of the steering wheel 40, an installation region of the mobile terminal 36 and a display region of the HUD device 12 might be superimposed on each other depending on a size of the installed mobile terminal 36 (refer to superimposed portion S in FIG. 4B). In this case, as illustrated in FIG. 5B, the display screen of the mobile terminal 36 is located on a driver side, and a display screen of the HUD device 12 is displayed on a back side of the mobile terminal 36, so that it is difficult for the driver to visually recognize a part of the virtual image 20 (display information) of the HUD device 12 in the superimposed portion S. For example, in FIG. 5B, the display information of "shift position" and "vehicle speed" displayed in the superimposed portion S are hidden by the mobile terminal 36, so that it becomes difficult to visually recognize the same.

Therefore, in this embodiment, when the mobile terminal installation detection unit 16 detects that the mobile terminal 36 is installed on the terminal holder 14, the mobile terminal installation detection unit 16 outputs a detection signal to the control unit 18. When the detection signal is input to the control unit 18, the control unit 18 outputs an information display quantity change signal that changes the information display quantity of the virtual image 20 of the HUD device 12 from the first information display quantity Q1 to the second information display quantity Q2 to the HUD device 12. Accordingly, the information display quantity of the virtual image 20 of the HUD device 12 is switched from the normal first information display quantity Q1 to the second information display quantity Q2 smaller than the normal information display quantity.

Figure 5C:
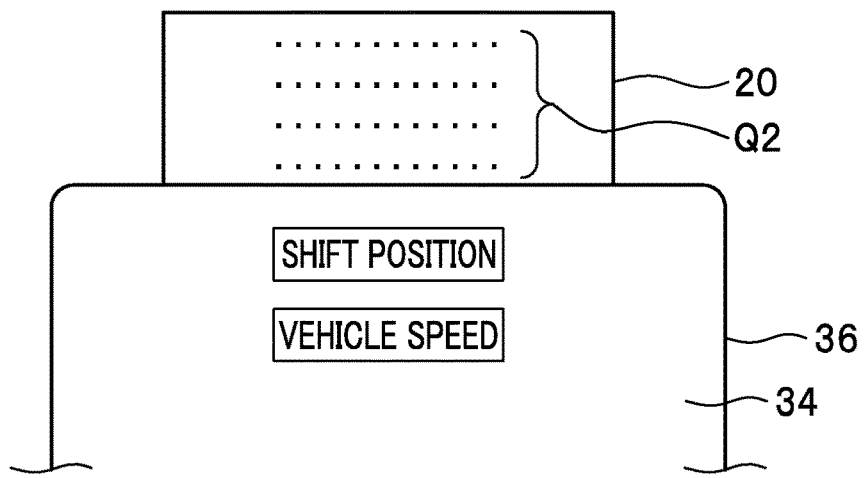
FIG. 5C is a schematic diagram illustrating a state in which information displayed in the first information display quantity but is not displayed in the second information display quantity is displayed on the mobile terminal.

By switching from the first information display quantity Q1 to the second information display quantity Q2, the control unit 18 transfers the display information of the superimposed portion S displayed in the first information display quantity Q1 but not displayed in the second information display quantity Q2 to the mobile terminal 36 and displays the same on the display screen 34 of the mobile terminal 36 (refer to FIG. 1). That is, the display information of "shift position" and the display information of "vehicle speed" not displayed in the second information display quantity Q2 (refer to FIG. 5B) are transferred to the mobile terminal 36, and the display information of "shift position" and the display information of "vehicle speed" are displayed on the display screen 34 of the mobile terminal 36 (refer to FIG. 5C).

Accordingly, the driver may surely visually recognize at least a part of the display information of the virtual image 20 of the HUD device 12 difficult to be visually recognized due to an upper portion of the mobile terminal 36 as an obstacle when the mobile terminal 36 is installed on the terminal holder 14 by the display screen 34 of the mobile terminal 36.

In this embodiment, although a case where a part of the display information of the virtual image 20 of the HUD device 12 superimposed on the mobile terminal 36 is transferred to the mobile terminal 36 when the mobile terminal 36 is installed on the terminal holder 14 is illustrated, the present invention is not limited thereto. For example, the operator may arbitrarily select (one or a plurality of pieces of) desired display information to be displayed on the virtual image 20 of the HUD device 12 using a switch device not illustrated, and display the selected desired display information on the display screen 34 of the mobile terminal 36.

In this embodiment, although a case where the mobile terminal 36 installed on the terminal holder 14 is superimposed on a part of the display information of the virtual image 20 of the HUD device 12 is described, the present invention is not limited thereto. For example, even in a case where the mobile terminal 36 installed on the terminal holder 14 and the display information of the virtual image 20 of the HUD device 12 are spaced apart and not superimposed on each other, the information display quantity of the virtual image 20 of the HUD device 12 may be controlled to be switched from the normal first information display quantity Q1 to the second information display quantity Q2 smaller than the normal information display quantity.

Next, a head-up display control system 100 according to another embodiment of the present invention is described. The same component as that of the above-described embodiment illustrated in FIGS. 1 to 3 is assigned with the same reference sign, and a detailed description thereof is not repeated.

Figure 8A:
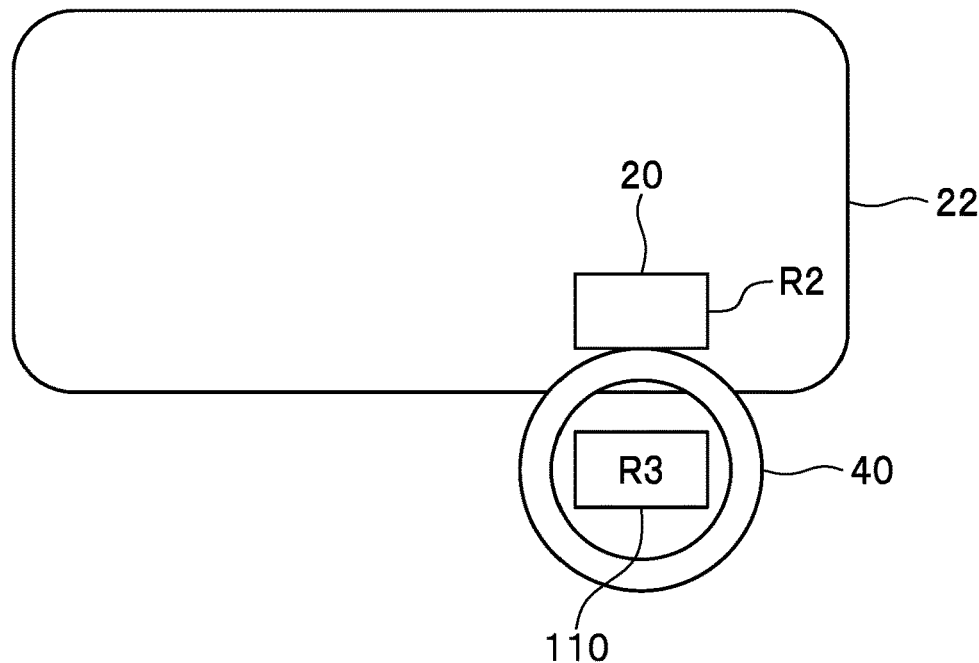
FIG. 8A is a schematic diagram illustrating a second display region and a third display region in a state in which the mobile terminal is not installed yet on the terminal holder.
Figure 8B:
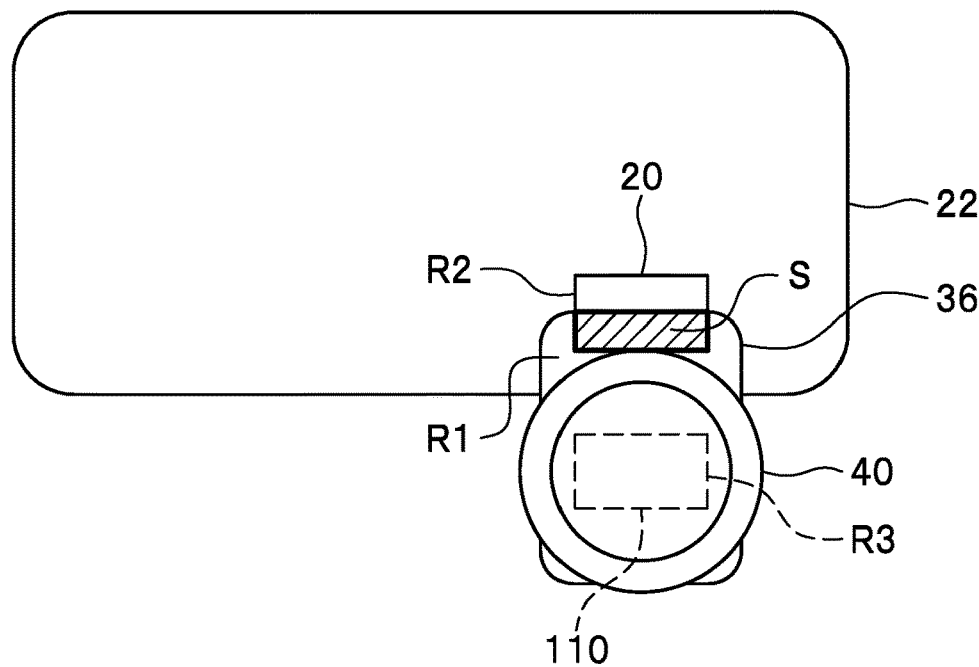
FIG. 8B is a schematic diagram illustrating a relationship among first to third display regions in a state in which the mobile terminal is installed on the terminal holder.

FIG. 6 is a partial virtual perspective view illustrating a state in which a mobile terminal is not installed yet on a terminal holder in the head-up display control system according to another embodiment of the present invention, FIG. 7 is a partial virtual perspective view illustrating a state in which the mobile terminal is installed on the terminal holder in the state illustrated in FIG. 6, FIG. 8A is a schematic diagram illustrating a second display region and a third display region in the state in which the mobile terminal is not installed yet on the terminal holder, and FIG. 8B is a schematic diagram illustrating a relationship among first to third display regions in the state in which the mobile terminal is installed on the terminal holder.

As illustrated in FIG. 6, the head-up display control system 100 according to another embodiment is different from that of the above-described embodiment in that a display unit 110 capable of displaying display information is provided on a vehicle rear surface of a terminal holder 14a close to a driver side.

A display region of a display screen of a mobile terminal 36 is set as a first display region R1, a display region in which a virtual image 20 of a HUD device 12 is displayed is set as a second display region R2, and a display region of the display unit 110 provided on the terminal holder 14a is set as a third display region R3 (refer to FIGS. 8A and 8B). In this case, a size relationship of the areas of the display regions is represented as second display region R2<third display region R3<first display region R1. That is, the area of the first display region R1 is larger than the area of the third display region R3 (refer to FIG. 8B).

Accordingly, in a case where the mobile terminal 36 including the first display region R1 larger than the third display region R3 is installed on the terminal holder 14, a user of the vehicle might want to increase an information display quantity of the mobile terminal 36 arranged in the vicinity of the third display region R3 as compared with the information display quantity of the virtual image 20 of the HUD device 12. By controlling to switch the information display quantity of the virtual image of the HUD device 12 from the first information display quantity Q1 to the second information display quantity Q2 in response to such a request of the user, it is possible to meet the needs of the user.

In this embodiment, a case where the virtual image 20 of the HUD device 12 is directly displayed on the front window 22 is illustrated as the "position overlapping with the window", but the present invention is not limited thereto, and for example, a case where the display information of the HUD device 12 is displayed on a half mirror not illustrated fixed onto the instrument panel and installed in front of the front window 22 is also included.

What is claimed is:

1. A head-up display control system comprising:
 a head-up display device that is installed in a vehicle and displays display information in a position overlapping with a window;
 a terminal holder provided so as to be able to hold a mobile terminal and installed in the vicinity of the window in a vehicle interior;
 a mobile terminal installation detection unit that detects whether the mobile terminal is installed on the terminal holder; and
 a control unit that controls the head-up display device; wherein
 a normal information display quantity of the head-up display device is set as a first information display quantity,
 an information display quantity of the head-up display device after the control unit receives a detection signal of detection of installation of the mobile terminal on the terminal holder from the mobile terminal installation detection unit is set as a second information display quantity,
 the second information display quantity is set to be smaller than the first information display quantity, and
 at least a part of display information that is displayed in the first information display quantity but is not displayed in the second information display quantity is displayed on the mobile terminal.

2. The head-up display control system according to claim 1, wherein
 a display region of the mobile terminal is set as a first display region, a display region of the head-up display device is set as a second display region, a display region of a display unit that is provided on the terminal holder and displays display information is set as a third display region, and the first display region is larger than the third display region.

3. A head-up display display method using the head-up display control system according to claim 1, the head-up display display method comprising:

detecting, by the mobile terminal installation detection unit, whether the mobile terminal is installed on the terminal holder; and outputting, by the control unit, an information display quantity change signal that changes an information display quantity of the head-up display device from the first information display quantity to the second information display quantity to the head-up display device when the mobile terminal installation detection unit detects that the mobile terminal is installed on the terminal holder, wherein the second information display quantity is set to be smaller than the first information display quantity, and at least a part of display information that is displayed in the first information display quantity but is not displayed in the second information display quantity is displayed on the mobile terminal.

4. A head-up display display method using the head-up display control system according to claim 2, the head-up display display method comprising:

detecting, by the mobile terminal installation detection unit, whether the mobile terminal is installed on the terminal holder; and outputting, by the control unit, an information display quantity change signal that changes an information display quantity of the head-up display device from the first information display quantity to the second information display quantity to the head-up display device when the mobile terminal installation detection unit detects that the mobile terminal is installed on the terminal holder, wherein the second information display quantity is set to be smaller than the first information display quantity, and at least a part of display information that is displayed in the first information display quantity but is not displayed in the second information display quantity is displayed on the mobile terminal.

\* \* \* \* \*